April 21, 1931. J. H. LIETZ 1,801,930
POT FOR PLANTS
Filed Aug. 14, 1929

J. H. Lietz
INVENTOR.

BY  *Lacey & Lacey*
ATTORNEYS

Patented Apr. 21, 1931

1,801,930

UNITED STATES PATENT OFFICE

JOHN H. LIETZ, OF MOSINEE, WISCONSIN

POT FOR PLANTS

Application filed August 14, 1929. Serial No. 385,721.

This invention has for its object the provision of a durable and inexpensive pot for young plants which will thoroughly protect the roots and which may be manipulated so as to easily discharge the plants without injury when the plant has reached a growth suitable for transplanting. The invention is illustrated in the accompanying drawing and will be hereinafter fully set forth.

Figure 1:
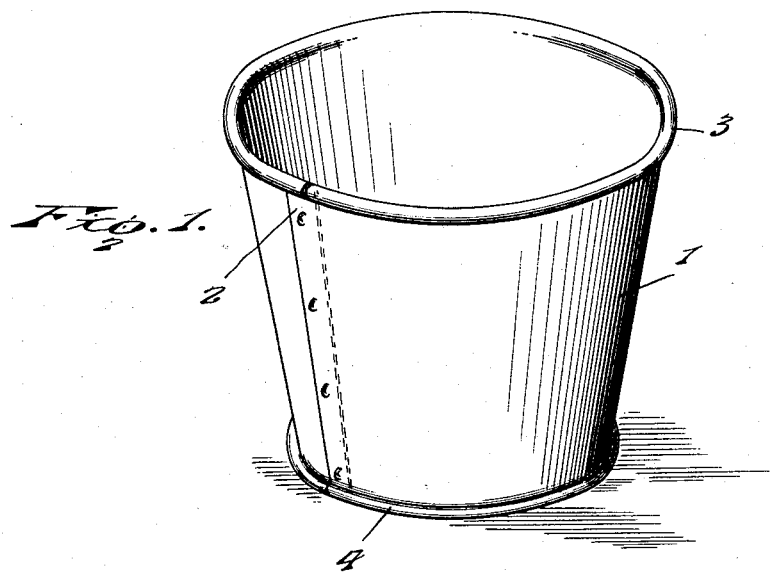
Figure 1 is a perspective view of a pot embodying the invention.
Figure 2:
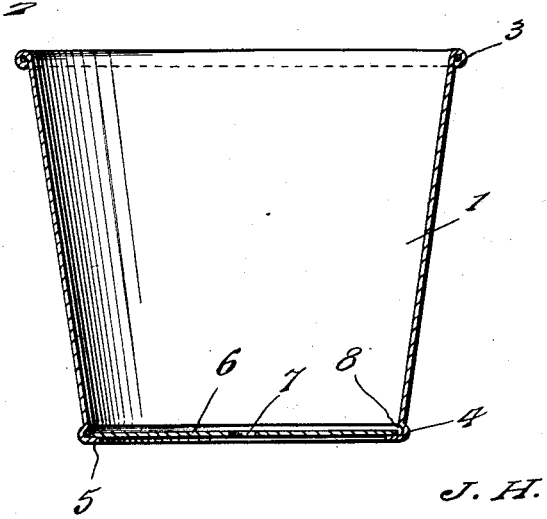
Fig. 2 is a vertical diametrical section of the same.

The body of my improved flower pot is of sheet metal and, as shown at 1, consists of a band rolled into the form of a tapered drum and having its edges brought together in overlapping relation, as shown at 2, and firmly united by riveting, welding or otherwise. One edge of the blank which becomes the top edge of the pot is rolled into a bead 3 whereby the pot is reinforced and the tendency of the edge portion to buckle is restricted. The lower edge of the pot is preferably pressed into a ridge 4 extending around the entire circumference of the pot and presenting an inwardly projecting annular flange 5 upon which rests a removable bottom 6 consisting of a sheet metal disk having a central opening 7 therethrough. The diameter of the disk is such that it will easily clear the contracted portion of the inner wall of the pot when a plant is to be removed and it will be noted that the beaded or ribbed portion 4 presents a groove 8 in its inner side into which dirt may settle so as to bind the bottom against accidental displacement.

The pot is used in the usual manner to contain a plant which is to be developed and the opening 7 provides drainage so that the soil in which the seed is planted or in which the young plant is set may be freely watered but will not become sour. When the plant has reached such a size that it is suitable for transplanting, it is not necessary to destroy the pot in order to release the plant but pressure exerted upon the removable bottom plate 6 will force the same up through the body of the pot and, therefore, remove the plant with all the dirt around its roots so that the roots will be protected against injury and may be set in the ground in an opening prepared therefor without being exposed at any time. The growth of the plant, consequently, is not interrupted at all and the development of the plant is thereby facilitated. The pot is practically indestructible and may be used repeatedly and may be initially produced at a very low cost.

Having thus described the invention, I claim:

A flower pot comprising a band of sheet material rolled to provide a tapered body and having its edges brought together and permanently connected, the top edge of the body being rolled to provide a reinforcing bead, and the bottom edge being pressed to provide an outer ridge and an inner circumferential flange and groove, and a bottom removably supported upon the inner flange and adapted to be held from displacement by earth entering said groove.

In testimony whereof I affix my signature.

JOHN H. LIETZ. [L. S.]